United States Patent
Kim

(10) Patent No.: US 9,416,266 B2
(45) Date of Patent: Aug. 16, 2016

(54) THERMOPLASTIC RESIN COMPOSITION HAVING EXCELLENT COLORABILITY AND MECHANICAL AND PHYSICAL PROPERTIES

(71) Applicant: Samsung SDI Co., Ltd., Yongin-si (KR)

(72) Inventor: Young Hyo Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/520,631

(22) Filed: Oct. 22, 2014

(65) Prior Publication Data

US 2015/0119489 A1 Apr. 30, 2015

(30) Foreign Application Priority Data

Oct. 25, 2013 (KR) .................. 10-2013-0128137

(51) Int. Cl.
*C08L 25/12* (2006.01)
*C08L 51/04* (2006.01)

(52) U.S. Cl.
CPC ............. *C08L 25/12* (2013.01); *C08L 51/04* (2013.01); *C08L 2205/025* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,994,523 A | | 2/1991 | Sasaki et al. |
| 5,272,205 A | * | 12/1993 | Eichenauer et al. ............ 525/64 |
| 5,990,239 A | | 11/1999 | Chang et al. |
| 6,103,821 A | * | 8/2000 | Fischer et al. ................ 524/804 |
| 6,232,397 B1 | * | 5/2001 | Weber et al. ..................... 525/67 |
| 2004/0024121 A1 | | 2/2004 | Schultes et al. |
| 2004/0039083 A1 | | 2/2004 | Schultes et al. |

FOREIGN PATENT DOCUMENTS

| | | |
|---|---|---|
| EP | 0326038 A1 | 8/1989 |
| EP | 0872519 A1 | 10/1998 |
| WO | 02/36682 A1 | 5/2002 |
| WO | 02/36683 A1 | 5/2002 |

OTHER PUBLICATIONS

Search Report in counterpart European Application No. 14190240.3 dated Mar. 11, 2015, pp. 1-5.

* cited by examiner

*Primary Examiner* — Jeffrey Mullis

(74) *Attorney, Agent, or Firm* — Additon, Higgins & Pendleton, P.A.

(57) ABSTRACT

Provided is a thermoplastic resin composition including: an acrylic graft copolymer (A), an aromatic vinyl-vinyl cyanide compound copolymer (B), a polyalkyl(meth)acrylate resin (C), and an acrylic compound-grafted silicon-based impact reinforcing agent (D). The thermoplastic resin composition can have excellent impact resistance and colorability with minimal or no deterioration of dimensional stability, molding processability, weather resistance and mechanical and physical properties.

9 Claims, No Drawings

THERMOPLASTIC RESIN COMPOSITION HAVING EXCELLENT COLORABILITY AND MECHANICAL AND PHYSICAL PROPERTIES

CROSS-REFERENCE TO RELATED APPLICATIONS

This application claims priority under 35 U.S.C. §119 to Korean Patent Application No. 10-2013-0128137, filed on Oct. 25, 2013, in the Korean Intellectual Property Office, the disclosure of which is incorporated herein by reference in its entirety.

FIELD OF THE INVENTION

The following disclosure relates to a thermoplastic resin composition that can have excellent colorability and mechanical and physical properties.

BACKGROUND

Acrylonitrile-styrene-acrylate is a thermoplastic resin (hereinafter, referred to as an ASA resin) that has low specific gravity as compared to glass or metal, and has excellent physical properties such as moldability, weather resistance, chemical resistance, thermal stability, and the like. Recently, products made using plastics are rapidly replacing glass or metals in electric and electronic devices, automotive products, construction materials, leisure products, and the like.

Accordingly, the plastic products should have various physical properties, such as impact strength, weather resistance, molding processability, appearance property, and the like. For example, interior and exterior materials of the product made using a plastic should have good colorability (to implement various colors) and simultaneously have excellent weather resistance. In addition, excellent mechanical and physical properties are needed while having a desired aesthetic appearance after a molding process.

In order to improve impact resistance in the ASA resin, a styrene-acrylonitrile (SAN) resin and g-ASA can be mixed in an ASA resin composition, wherein a method of increasing a molecular weight of the SAN resin or the content of g-ASA or a method of including a diene-based graft copolymer has been used. The resin composition can have improved impact resistance; however, the composition can also have deteriorated thermal stability, chemical resistance, moldability, appearance property and colorability. That is, it can be difficult to simultaneously improve colorability and mechanical and physical properties due to properties of the resin itself.

Therefore, there is a need for a thermoplastic resin composition having excellent colorability so as to implement various colors without deteriorating impact resistance, weather resistance, thermal stability, molding processability, and appearance.

SUMMARY

An embodiment of the present invention is directed to providing a thermoplastic resin composition that can have excellent impact resistance, weather resistance, and colorability.

In addition, another embodiment of the present invention is directed to providing a molded product that can have excellent impact resistance, weather resistance, thermal stability, molding processability, and appearance property, and can have a desirable aesthetic appearance, using the thermoplastic resin composition.

In exemplary embodiments, the present invention provides a thermoplastic resin composition that can have excellent impact resistance and colorability including: an acrylic graft copolymer (A), an aromatic vinyl-vinyl cyanide compound copolymer (B), a polyalkyl(meth)acrylate resin (C), and an acrylic compound-grafted silicon-based impact reinforcing agent (D).

The thermoplastic resin composition can include the acrylic compound-grafted silicon-based impact reinforcing agent (D) in an amount of about 0.1 to about 3 parts by weight based on about 100 parts by weight of a mixture including about 25 to 50 wt % of the acrylic graft copolymer (A), about 45 to 70 wt % of the aromatic vinyl-vinyl cyanide compound copolymer (B), and about 0.1 to 5 wt % of the polyalkyl (meth)acrylate resin (C).

The acrylic graft copolymer (A) may have a core-shell structure in which an unsaturated monomer including (meth)acrylate is grafted to a core including an acrylate-based rubber-like polymer to thereby form a shell.

The acrylate-based rubber-like polymer may have an average particle size of about 100 to about 500 nm.

The polyalkyl(meth)acrylate resin may have a weight average molecular weight of about 10,000 to about 200,000 g/mol.

The acrylic compound-grafted silicon-based impact reinforcing agent may include a silicon-based compound as a core and an acrylic compound as a shell.

A weight ratio of the core to the shell in the acrylic compound-grafted silicon-based impact reinforcing agent may be about 60 to 90: about 10 to 40.

The acrylic compound-grafted silicon-based impact reinforcing agent may have an average particle size of about 100 to about 1,000 nm.

The thermoplastic resin composition of claim may further include a (meth)acrylic acid alkyl ester component-containing styrene-based copolymer resin.

The (meth)acrylic acid alkyl ester component-containing styrene-based copolymer resin may include about 5 to about 50 wt % of a (meth)acrylic acid alkyl ester component.

A weight mixing ratio of the polyalkyl(meth)acrylate resin to the acrylic compound-grafted silicon-based impact reinforcing agent may be about 2:1 to about 2:4.

The thermoplastic resin composition may further include at least any one or two or more components selected from a group consisting of an antioxidant, a lubricant, an impact reinforcing agent, a light stabilizer, a dye, a pigment, a flame retardant, a filler, a stabilizer, an antibacterial agent, a release agent, a plasticizer and/or an antistatic agent.

In another exemplary embodiments, the present invention provides a molded product manufactured by the thermoplastic resin composition as described above.

Other features and aspects will be apparent from the following detailed description, the drawings, and the claims.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a thermoplastic resin composition according to the present invention is described in detail. The exemplary embodiments of the present invention to be described below are provided by way of example so that the idea of the present invention can be sufficiently transferred to those skilled in the art to which the present invention pertains. As used herein, unless technical and scientific terms used herein are defined otherwise, they have meanings understood by those skilled in the art to which the present invention pertains. Known functions and components which obscure the description and the accompanying drawings of the present invention with unnecessary detail will be omitted.

The thermoplastic resin composition of the present invention may include:
an acrylic graft copolymer (A),
an aromatic vinyl-vinyl cyanide compound copolymer (B),
a polyalkyl(meth)acrylate resin (C), and
an acrylic compound-grafted silicon-based impact reinforcing agent (D).

In the thermoplastic resin composition, a mixture of the acrylic graft copolymer (A), the aromatic vinyl-vinyl cyanide compound copolymer (B), and the polyalkyl(meth)acrylate resin (C) may be used as a base resin.

In addition, the thermoplastic resin composition can include the acrylic compound-grafted silicon-based impact reinforcing agent (D) in an amount of about 0.1 to 3 parts by weight based on about 100 parts by weight of a mixture including about 25 to 50 wt % of the acrylic graft copolymer (A), about 45 to 70 wt % of the aromatic vinyl-vinyl cyanide compound copolymer (B), and about 0.1 to 5 wt % of the polyalkyl(meth)acrylate resin (C).

Hereinafter, each component is described in more detail.

(A) Acrylic Graft Copolymer

The acrylic graft copolymer in the present invention may be prepared by graft-polymerizing a monomer mixture including an aromatic vinyl compound and a vinyl cyanide compound to an acrylate-based rubber-like polymer. The polymerization may include general preparation methods such as emulsion polymerization, suspension polymerization, solution polymerization, mass polymerization, and the like.

The acrylate-based rubber-like polymer may be an alkyl acrylate-based rubber, for example, C2 to C10 alkyl acrylate-based rubber. Examples of the alkyl acrylate-based rubber-like polymer may include without limitation butyl acrylate polymer, ethyl hexyl acrylate rubber-like polymer, and the like, and mixtures thereof.

The acrylic graft copolymer (A) can include the acrylate-based rubber-like polymer in an amount of about 40 to about 60 wt % (based on solid content) based on the total weight (100 wt %) of the acrylic graft copolymer (A). In addition, the acrylate-based rubber-like polymer may have an average particle size of about 100 to about 500 nm, for example, about 100 to about 300 nm.

The monomer mixture including an aromatic vinyl compound and a vinyl cyanide compound grafted to the acrylate-based rubber-like polymer may include about 70 to 80 wt % of the aromatic vinyl compound and about 20 to 30 wt % of the vinyl cyanide compound.

In addition, the acrylic graft copolymer (A) can include the aromatic vinyl-vinyl cyanide compound copolymer grafted to the acrylate-based rubber-like polymer in an amount of about 40 to 60 wt % based on the total weight (100 wt %) of the acrylic graft copolymer (A).

Examples of the aromatic vinyl compound may include without limitation styrene, α-methylstyrene, p-methylstyrene, p-t-butylstyrene, 2,4-dimethylstyrene, chlorostyrene, vinyl toluene, vinyl naphthalene, and the like, and may be used alone or in combination thereof. In exemplary embodiments, styrene may be used.

Examples of the vinyl cyanide compound may include without limitation acrylonitrile, methacrylonitrile, and the like, and may be used alone or in combination thereof. In exemplary embodiments, acrylonitrile may be used.

The acrylic graft copolymer may be acrylonitrile-styrene-acrylate-based graft copolymer (ASA resin).

The ASA resin may be prepared by adding acrylonitrile and styrene to an acrylic rubber and performing an acrylonitrile-styrene copolymerization reaction by a general polymerization method, and simultaneously performing a graft copolymerization reaction to the acrylic rubber. The ASA resin may have weather resistance and chemical resistance.

The acrylic graft copolymer in the present invention may be present in an amount of about 25 to about 50 wt % based on the total weight (100 wt %) of the base resin including the acrylic graft copolymer, the aromatic vinyl-vinyl cyanide compound copolymer, and the polyalkyl(meth)acrylate resin. In some embodiments, the thermoplastic resin composition may include the acrylic graft copolymer in an amount of about 25, 26, 27, 28, 29, 30, 31, 32, 33, 34, 35, 36, 37, 38, 39, 40, 41, 42, 43, 44, 45, 46, 47, 48, 49, or 50 wt %, based on the total weight of the base resin. Further, according to some embodiments of the present invention, the amount of the acrylic graft copolymer can be in a range from about any of the foregoing amounts to about any other of the foregoing amounts.

When the acrylic graft copolymer is present in an amount of less than about 25 wt %, weather resistance may be deteriorated. When the acrylic graft copolymer is present in an amount of more than about 50 wt %, heat resistance may be deteriorated.

(B) Aromatic Vinyl-Vinyl Cyanide Compound Copolymer

The aromatic vinyl-vinyl cyanide compound copolymer in the present invention may be a copolymer of an aromatic vinyl compound and a vinyl cyanide compound. The aromatic vinyl-vinyl cyanide compound copolymer may have a weight average molecular weight of about 15,000 to about 400,000 g/mol.

Examples of the aromatic vinyl compound can include without limitation styrene, C1 to C10 alkyl-substituted styrene, halogen-substituted styrene, vinyl toluene, vinyl naphthalene, and the like, and mixtures thereof. Specific examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and mixtures thereof.

Examples of the vinyl cyanide compound can include without limitation acrylonitrile, methacrylonitrile, ethacrylonitrile and the like and mixtures thereof.

The aromatic vinyl-vinyl cyanide compound copolymer may be a styrene-acrylonitrile copolymer; an α-methyl styrene-acrylonitrile copolymer; and/or a styrene-α-methylstyrene-acrylonitrile copolymer, for example, a styrene-acrylonitrile copolymer.

The aromatic vinyl-vinyl cyanide compound copolymer (B) in the present invention may be present in an amount of about 45 to 70 wt % based on the total weight (100 wt %) of the base resin including the acrylic graft copolymer, the aromatic vinyl-vinyl cyanide compound copolymer, and the polyalkyl(meth)acrylate resin. In some embodiments, the thermoplastic resin composition may include the aromatic vinyl-vinyl cyanide compound copolymer in an amount of about 45, 46, 47, 48, 49, 50, 51, 52, 53, 54, 55, 56, 57, 58, 59, 60, 61, 62, 63, 64, 65, 66, 67, 68, 69, or 70 wt %, based on the total weight of the base resin. Further, according to some embodiments of the present invention, the amount of the aromatic vinyl-vinyl cyanide compound copolymer can be in a range from about any of the foregoing amounts to about any other of the foregoing amounts.

When the aromatic vinyl-vinyl cyanide compound copolymer is present in an amount of less than about 45 wt %, heat resistance and impact resistance may be deteriorated. When the aromatic vinyl-vinyl cyanide compound copolymer is present in an amount of more than about 70 wt %, weather resistance and colorability may be deteriorated.

(C) Polyalkyl(Meth)Acrylate

The polyalkyl(meth)acrylate in the present invention may have excellent impact resistance, gloss and hydrolytic resistance, and may improve miscibility and chemical resistance of the resin composition by combination with other components in the composition.

The polyalkyl(meth)acrylate may be prepared with raw material monomers including alkyl(meth)acrylate by general polymerization methods such as a suspension polymerization method, a mass polymerization method, an emulsion polymerization method, and the like.

The alkyl(meth)acrylate has a C1 to C10 alkyl group, wherein alkyl of the alkyl(meth)acrylate may be further substituted with other functional groups, and specific examples of the functional groups to be substituted may include hydroxy, C2 to C10 heterocycloalkyl. Examples of the alkyl (meth)acrylate may include methyl(meth)acrylate, ethyl (meth)acrylate, butyl(meth)acrylate, glycidyl(meth)acrylate, hydroxyethyl(meth)acrylate, and the like.

The polyalkyl(meth)acrylate resin can include the alkyl (meth)acrylate in an amount of about 50 wt % or more, for example, about 80 to about 99 wt %, based on the total weight (100 wt %) of the polyalkyl(meth)acrylate resin.

The raw material monomer configuring the polyalkyl (meth)acrylate may further include a vinyl-based monomer in addition to the alkyl(meth)acrylate. Examples of the vinyl-based monomer may include without limitation aromatic vinyl monomers such as styrene, α-methylstyrene, p-methylstyrene, and the like; and unsaturated nitrile monomers such as acrylonitrile, methacrylonitrile, and the like, and may be used alone or in combination thereof.

The polyalkyl(meth)acrylate may have a weight average molecular weight of about 10,000 to about 200,000 g/mol, for example, about 15,000 to about 150,000 g/mol. In the case in which the polyalkyl(meth)acrylate has a weight average molecular weight satisfying the above-described range, compatibility between an acrylic graft copolymer (A) and an aromatic vinyl-based compound and vinyl cyanide-based compound copolymer (B) may be improved to implement excellent hydrolytic resistance, scratch resistance, and processability of the resin composition.

The polyalkyl(meth)acrylate resin in the present invention may be present in an amount of about 0.1 to about 5 wt % based on the total weight (100 wt %) of the base resin including the acrylic graft copolymer, the aromatic vinyl-vinyl cyanide compound copolymer, and the polyalkyl(meth)acrylate resin. In some embodiments, the thermoplastic resin composition may include the polyalkyl(meth)acrylate resin in an amount of about 0.1, 0.2, 0.3, 0.4, 0.5, 0.6, 0.7, 0.8, 0.9, 1, 2, 3, 4 or 5 wt %, based on the total weight of the base resin. Further, according to some embodiments of the present invention, the amount of the polyalkyl(meth)acrylate resin can be in a range from about any of the foregoing amounts to about any other of the foregoing amounts.

When the polyalkyl(meth)acrylate resin is present in an amount of less than about 0.1 wt %, impact resistance and appearance property may be deteriorated. When the polyalkyl (meth)acrylate resin is present in an amount of more than about 5 wt %, heat resistance and processability may be deteriorated.

(D) Acrylic Compound-Grafted Silicon-Based Impact Reinforcing Agent

The acrylic compound-grafted silicon-based impact reinforcing agent in the present invention may be a core-shell graft copolymer. In detail, the acrylic compound as a shell component may be grafted to the silicon-based compound as a core component.

The silicon-based compound may have two or more unsaturated functional groups. Examples of the silicon-based compound may include without limitation methyl-vinyl-dimethoxysilane, methyl-vinyl-diethoxysilane, methyl-vinyl-diacetoxysilane, 1,1,1,3,5,5,5,-heptamethyl-3-vinyl-trisiloxane, 2,4,6,8-tetramethyl-tetravinyl-cyclotetrasiloxane, α, ω-divinyl-polydimethylsiloxane, vinyl-modified dimethylsiloxane, and the like, and mixtures thereof.

Examples of the acrylic compound may include without limitation methacrylic acid esters, acrylic acid esters, unsaturated carboxylic acids, acid anhydrides, esters containing hydroxyl groups, and the like, and mixtures thereof. As examples thereof, the acrylic compound may include without limitation methacrylic acid esters including methyl methacrylate, ethyl methacrylate, propyl methacrylate, butyl methacrylate, hexyl methacrylate, 2-ethylhexyl methacrylate and benzyl methacrylate; acrylic acid esters including methyl acrylate, ethyl acrylate, propyl acrylate, butyl acrylate, hexyl acrylate, 2-ethylhexyl acrylate, cyclohexyl methacrylate, phenyl methacrylate and benzyl methacrylate; unsaturated carboxylic acids including acrylic acid and methacrylic acid; acid anhydrides including maleic anhydride; esters containing hydroxyl groups including 2-hydroxyethyl acrylate, 2-hydroxypropyl acrylate and monoglycerol-acrylate, and the like, and mixtures thereof.

In addition, other examples of the acrylic compound may include without limitation aromatic and/or aliphatic(meth) acrylates. As examples thereof, the acrylic compound may include without limitation cyclohexyl methacrylate, phenoxy methacrylate, phenoxy ethyl methacrylate, 2-ethylphenoxy methacrylate, 2-ethylthiophenyl methacrylate, 2-ethylaminophenyl methacrylate, phenyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, and the like, and mixtures thereof.

The acrylic compound-grafted silicon-based impact reinforcing agent in the present invention may be a silicon-based reinforcing agent having a core-shell structure in which methyl methacrylate alone or a mixture of methyl methacrylate and butyl acrylate is grafted to a dimethylsiloxane compound.

A weight ratio of the core to the shell in the acrylic compound-grafted silicon-based impact reinforcing agent having a core-shell structure may be about 60 to 90 (core): about 10 to 40 (shell). When satisfying the above-described range, the resin composition may simultaneously increase physical properties of weather resistance, colorability, and impact resistance with minimal or no deterioration of any one physical property, by combining with other components.

The acrylic compound-grafted silicon-based impact reinforcing agent having a core-shell structure may include an acrylic compound to be grafted in an amount of about 10 to about 40 wt %, for example, about 20 to about 30 wt %. In the case in which the acrylic compound satisfies the above-described content, impact resistance and colorability may be simultaneously and remarkably improved with minimal or deterioration of physical properties such as heat resistance, weather resistance, processability, and the like, by combining with other components.

The core of acrylic compound-grafted silicon-based impact reinforcing agent in the present invention may have an average particle size of about 100 to about 1,000 nm, for example, about 200 to about 600 nm, and as another example, about 300 to about 500 nm. When the average particle size is more than about 1,000 nm, colorability may be deteriorated as compared to impact resistance. When the average particle size is less than about 100 nm, impact resistance may be deteriorated as compared to colorability.

In addition, the acrylic compound-grafted silicon-based impact reinforcing agent may express an effect of increasing impact resistance and colorability by adjusting a weight mixing ratio with the polyalkyl(meth)acrylate resin. The weight mixing ratio of the polyalkyl(meth)acrylate resin to the acrylic compound-grafted silicon-based impact reinforcing agent may be about 2:1 to about 2:4.

The acrylic compound-grafted silicon-based impact reinforcing agent in the present invention may be present in an amount of about 0.1 to about 3 parts by weight based on about 100 parts by weight of the base resin including the acrylic graft copolymer, the aromatic vinyl-vinyl cyanide compound copolymer, and the polyalkyl(meth)acrylate resin. In some embodiments, the thermoplastic resin composition may include the acrylic compound-grafted silicon-based impact reinforcing agent in an amount of about 0.1, 0.2, 0.3, 0.4, 0.5, 0.6, 0.7, 0.8, 0.9, 1, 2, or 3 parts by weight based on about 100 parts by weight of the base resin. Further, according to some embodiments of the present invention, the amount of the acrylic compound-grafted silicon-based impact reinforcing agent can be in a range from about any of the foregoing amounts to about any other of the foregoing amounts.

When the acrylic compound-grafted silicon-based impact reinforcing agent is present in an amount of less than about 0.1 parts by weight, impact resistance and colorability may be deteriorated. When the acrylic compound-grafted silicon-based impact reinforcing agent is present in an amount of more than about 3 parts by weight, weather resistance, heat resistance and processability may be deteriorated.

(E) (Meth)acrylic Acid Alkyl Ester Component-Containing Styrene-based Copolymer Resin The resin composition in the present invention may further include a (meth)acrylic acid alkyl ester component-containing styrene-based copolymer resin in order to improve compatibility, heat resistance, colorability, and impact resistance.

The styrene-based copolymer resin may be prepared by copolymerizing a (meth)acrylic acid alkyl ester compound, an aromatic vinyl compound and a vinyl cyanide compound.

The (meth)acrylic acid alkyl ester compound may be (meth)acrylic acid C1 to C10 alkyl ester. Examples of the (meth)acrylic acid alkyl ester compound may include without limitation methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, ethylhexyl acrylate and the like and mixtures thereof.

The styrene-based copolymer resin may include about 5 to about 50 wt % of a (meth)acrylic acid alkyl ester compound, about 30 to 80 wt % of an aromatic vinyl compound and about 10 to about 40 wt % of vinyl cyanide compound, based on the total weight (100 wt %) of the styrene-based copolymer resin. For example, the styrene-based copolymer resin may include the (meth)acrylic acid alkyl ester compound in an amount of about 10 to about 30 wt %, and as another example, about 15 to about 20 wt %.

The (meth)acrylic acid alkyl ester component-containing styrene-based copolymer resin in the present invention may have a weight average molecular weight of about 100,000 to about 200,000 g/mol, for example, about 120,000 to about 160,000 g/mol.

The (meth)acrylic acid alkyl ester component-containing styrene-based copolymer resin in the present invention may be present in an amount of about 0.1 to about 3 wt % based on the total weight (100 wt %) of a base resin including the acrylic graft copolymer, the aromatic vinyl-vinyl cyanide compound copolymer, the polyalkyl(meth)acrylate resin, and the (meth)acrylic acid alkyl ester component-containing styrene-based copolymer resin. In some embodiments, the thermoplastic resin composition may include the (meth)acrylic acid alkyl ester component-containing styrene-based copolymer resin in an amount of about 0.1, 0.2, 0.3, 0.4, 0.5, 0.6, 0.7, 0.8, 0.9, 1, 2, or 3 wt % based on the total weight of a base resin including the acrylic graft copolymer, the aromatic vinyl-vinyl cyanide compound copolymer, the polyalkyl (meth)acrylate resin, and the (meth)acrylic acid alkyl ester component-containing styrene-based copolymer resin. Further, according to some embodiments of the present invention, the amount of the (meth)acrylic acid alkyl ester component-containing styrene-based copolymer resin can be in a range from about any of the foregoing amounts to about any other of the foregoing amounts.

When the (meth)acrylic acid alkyl ester component-containing styrene-based copolymer resin is present in an amount of less than about 0.1 wt %, impact resistance and colorability may be deteriorated. When the (meth)acrylic acid alkyl ester component-containing styrene-based copolymer resin is present in an amount of more than about 3 wt %, weather resistance, heat resistance and processability may be deteriorated.

The thermoplastic resin composition of the present invention may further optionally one or more additives as needed. Examples of the additives that can be mixed with the composition of the invention may include without limitation surfactants, nucleating agents, coupling agents, filler, plasticizers, impact reinforcing agents, lubricants, antimicrobial agents, release agents, heat stabilizers, antioxidants, light stabilizers, compatibilizers, stabilizers, antistatic agents, pigments, dyes, flame retardants, and the like, and mixtures thereof.

The thermoplastic resin composition of the present invention may be prepared as a resin molded product by general methods known in the art. For example, the thermoplastic resin composition may be prepared in pellet form by simultaneously mixing components of the present invention and other optional additives, and performing a melt extrusion in an extruder. In addition, plastic injection or compression molded products may be manufactured by general methods also known in the art, such as extrusion molding, injection molding, calendar molding, vacuum molding, and the like, using the pellets.

Hereinafter, the following Examples will be provided in order to describe the present invention in more detail. However, the present invention is not limited to the following Examples.

Specifications of each component used in the following Examples and Comparative Examples are as follows.

(A) Acrylic Graft Copolymer (A1) g-ASA having an average particle size of about 180 nm and including about 40 wt % of butyl acrylate is used.

(A2) g-ASA having an average particle size of about 320 nm and including about 60 wt % of butyl acrylate is used.

(B) Alpha-methylstyrene-Styrene-Acrylonitrile Copolymer (AMS-SAN)

(B1) A styrene-acrylonitrile copolymer (SAN) having a content of alpha-methylstyrene of about 54 wt % and a glass transition temperature of 1181° C. is used.

(B2) Styrene-Acrylonitrile Copolymer (SAN)

A styrene-acrylonitrile copolymer (SAN) having a content of acrylonitrile of about 32 wt % and a weight average molecular weight of about 120,000 g/mol is used.

(C) Polymethyl Methacrylate

Altuglas V040 manufactured by Arkema Inc. is used.

(D) Methyl Methacrylate-Grafted Silicon-Based Impact Reinforcing Agent

A silicon-based impact reinforcing agent [MMA content: about 25 wt %, Average Particle Size: about 500 nm] having a core-shell structure in which methyl methacrylate (MMA) is grafted to a polydimethylsiloxane (PDMS) and a butyl acrylate rubber (BAR) complex as a core component to thereby form a shell component is used.

(E) Methyl Methacrylate-grafted Styrene-Acrylonitrile Copolymer (MSAN)

A M-SAN copolymer resin including about 20 wt % of a methyl methacrylate monomer, about 20 wt % of an acrylonitrile monomer, and about 60 wt % of a styrene monomer and having a weight average molecular weight (Mw) of 80,000 g/mol is used.

The following Table 1 shows (A1), (A2), (B1), (B2), (C) and (E) by each wt % and (D) by parts by weight based on 100 parts by weight ((A1)+(A2)+(B1)+(B2)+(C)+(E)=100 wt %).

EXAMPLE 1

The above-mentioned components are mixed in a mixer with each composition shown in the following Table 1 and put into a twin screw extruder (L/D=29, ø=45 mm).

In Example 1, a thermoplastic resin composition is prepared by mixing 2 parts by weight of a methyl methacrylate-grafted silicon-based impact reinforcing agent (D), 2.5 parts by weight of carbon black masterbatch (40 wt % of BK-105), 0.4 part by weight of a lubricant (ethylene stearamide), and 1.3 parts by weight of a weather resistant stabilizer (obtained by mixing a hindered amine light stabilizer with a benzotriazole light absorber) based on 100 parts by weight of a mixture obtained by mixing 19 wt % of an acrylate-based copolymer (A1), 20 wt % of an acrylate-based copolymer (A2), 22 wt % of alpha-methylstyrene-styrene-acrylonitrile copolymer (B1), 37 wt % of styrene-acrylonitrile copolymers (B2) and 2 wt % of polymethyl methacrylate (C) and preparing in pellet form by an extruder. The composition is manufactured as a sample by a 60 oz injector at an injection temperature of 250° C. in order to evaluate physical properties. The sample is dried at 80° C. for 2 hours and manufactured so as to have a size of 9 cm×5 cm×0.2 cm. Physical properties of the sample are measured by the following evaluation methods and results thereof are shown in the following Table 2.

EXAMPLE 2

Example 2 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 3 wt % of polymethyl methacrylate (C), and 1 part by weight of a methyl methacrylate-grafted silicon-based impact reinforcing agent (D).

EXAMPLE 3

Example 3 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 3 wt % of polymethyl methacrylate (C), and 3 parts by weight of a methyl methacrylate-grafted silicon-based impact reinforcing agent (D).

EXAMPLE 4

Example 4 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 1 wt % of polymethyl methacrylate (C), and 2 wt % of methyl methacrylate-grafted styrene-acrylonitrile copolymer (MSAN) (E), and 1 parts by weight of a methyl methacrylate-grafted silicon-based impact reinforcing agent (D).

EXAMPLE 5

Example 5 is conducted by the same method as Example 1 above except for using 29 wt % of an acrylate-based copolymer (A1), 10 wt % of an acrylate-based copolymer (A2), 21 wt % of an alpha-methylstyrene-styrene-acrylonitrile copolymer (B1), 37 wt % of a styrene-acrylonitrile copolymer (B2) and 2 wt % of polymethyl methacrylate (C), and 1 wt % of methyl methacrylate-grafted styrene-acrylonitrile copolymer (MSAN) (E), and 1 parts by weight of a methyl methacrylate-grafted silicon-based impact reinforcing agent (D).

EXAMPLE 6

Example 6 is conducted by the same method as Example 1 above except for using 19 wt % of an acrylate-based copolymer (A1), 15 wt % of an acrylate-based copolymer (A2), 20 wt % of an alpha-methylstyrene-styrene-acrylonitrile copolymer (B1), 35 wt % of a styrene-acrylonitrile copolymer (B2) and 10 wt % of polymethyl methacrylate (C), and 1 part by weight of a methyl methacrylate-grafted silicon-based impact reinforcing agent (D).

EXAMPLE 7

Example 7 is conducted by the same method as Example 1 above except for using 19 wt % of an acrylate-based copolymer (A1), 15 wt % of an acrylate-based copolymer (A2), 20 wt % of an alpha-methylstyrene-styrene-acrylonitrile copolymer (B1), 35 wt % of a styrene-acrylonitrile copolymer (B2) and 1 wt % of polymethyl methacrylate (C), and 10 parts by weight of a methyl methacrylate-grafted silicon-based impact reinforcing agent (D).

COMPARATIVE EXAMPLE 1

Comparative Example 1 is conducted by the same method as Example 1 above except for preparing a composition at a content ratio of 24 wt % of an acrylate-based copolymer (A1), 15 wt % of an acrylate-based copolymer (A2), 21 wt % of an alpha-methylstyrene-styrene-acrylonitrile copolymer (B1) and 40 wt % of a styrene-acrylonitrile copolymer (B2).

COMPARATIVE EXAMPLE 2

Comparative Example 2 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 1 wt % of polymethyl methacrylate (C), and 2 wt % of a methyl methacrylate-grafted styrene-acrylonitrile copolymer (MSAN) (E).

COMPARATIVE EXAMPLE 3

Comparative Example 3 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 3 wt % of a methyl methacrylate-grafted styrene-acrylonitrile copolymer (MSAN) (E).

COMPARATIVE EXAMPLE 4

Example 4 is conducted by the same method as Example 1 above except for using 24 wt % of an acrylate-based copolymer (A1), 15 wt % of an acrylate-based copolymer (A2), 21 wt % of an alpha-methylstyrene-styrene-acrylonitrile copolymer (B1), 37 wt % of a styrene-acrylonitrile copolymer (B2) and 3 wt % of methyl methacrylate-grafted styrene-acrylonitrile copolymer (MSAN) (E), and 1 part by weight of a methyl methacrylate-grafted silicon-based impact reinforcing agent (D).

(Evaluation of Physical Properties)

(1) Notched Izod Impact Strength

Notched izod impact strength is measured (⅛ inch, kgf·cm/cm) based on ASTM D-256.

(2) Fluidity

Fluidity of the sample having 10 Kg is measured (g/10 min.) at 220° C. based on ISO1103.

(3) Weather Resistance and Colorability

[Visual evaluation is conducted on color chips in 4 steps by experts (⊚: significantly excellent, ○: excellent Δ: average, x: poor)]

An accelerated weathering property is evaluated by Metaling Vertical Weather Meter MV-3000 (manufactured by Suga Test Instruments Co., Ltd.).
Light Source: metal halide lamp
Irradiance: 55 W/m² (530 W/m² at 300~400)
Temp: 38° C.
Black panel temp.: 63° C.
Relative humidity: 50%
Test Duration (1 cycle, 2 phases): 2 hrs/1 cycle The dE (including dL, da and db) values are measured by Minolta CM-2500C colorimeter and calculated by the following Equation 1.
L: Lightness
a: red (+) ⇔ green (−)
b: yellow (+) ⇔ blue (−)

$$dE = \sqrt{(dL)^2 + (da)^2 + (db)^2}$$  Equation 1.

TABLE 1

| Classification | Example |   |   |   |   |   |   | Comparative Example |   |   |   |
|---|---|---|---|---|---|---|---|---|---|---|---|
|  | 1 | 2 | 3 | 4 | 5 | 6 | 7 | 1 | 2 | 3 | 4 |
| (A1) | 19 | 24 | 24 | 24 | 29 | 19 | 19 | 24 | 24 | 24 | 24 |
| (A2) | 20 | 15 | 15 | 15 | 10 | 15 | 15 | 15 | 15 | 15 | 15 |
| (B1) | 22 | 21 | 21 | 21 | 21 | 20 | 20 | 21 | 21 | 21 | 21 |
| (B2) | 37 | 37 | 37 | 37 | 37 | 35 | 35 | 40 | 37 | 37 | 37 |
| (C) | 2 | 3 | 3 | 1 | 1 | 10 | 1 | — | 1 | — | — |
| (E) | — | — | — | 2 | 2 | — | — | — | 2 | 3 | 3 |
| (D) | 2 | 1 | 3 | 1 | 1 | 1 | 10 | — | — | — | 1 |

TABLE 2

| Classification | Example |   |   |   |   |   |   | Comparative Example |   |   |   |
|---|---|---|---|---|---|---|---|---|---|---|---|
|  | 1 | 2 | 3 | 4 | 5 | 6 | 7 | 1 | 2 | 3 | 4 |
| Notched Izod Impact Strength | 20 | 10 | 12 | 17 | 16 | 3 | 30 | 15 | 12 | 7 | 6 |
| Fluidity | 6.2 | 5.5 | 5.6 | 6.7 | 6.5 | 9.0 | 5.2 | 5.3 | 6.0 | 6.5 | 6.4 |
| Weather Resistance (ΔE) | 1.6 | 1.5 | 1.6 | 1.6 | 1.5 | 0.9 | 2.0 | 1.2 | 1.5 | 1.4 | 1.4 |
| Colorability (ΔL) | −2.5 | −3.4 | −3.3 | −2.9 | −2.9 | −4.5 | 0.5 | 0 | −1.5 | −1.5 | −2.0 |
| Colorability (Naked Eye) | ○ | ⊚ | ⊚ | ⊚ | ⊚ | ⊚ | X | X | Δ | Δ | ○ |

It can be seen from Table 2 above that in the Examples according to the present invention, weather resistance, impact resistance and colorability are simultaneously improved. In contrast, in the Comparative Examples, both of impact resistance and colorability are low.

With the thermoplastic resin composition according to the present invention, excellent dimensional stability, molding processability, weather resistance, and gloss may be provided. In addition, impact resistance and colorability may be improved, various colors may be implemented, and aesthetic appearance property and excellent mechanical and physical properties may be expressed.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. A thermoplastic resin composition having impact resistance and colorability comprising:
   a base resin comprising about 25 to about 50 wt % of a (meth)acrylic graft copolymer (A); about 55 to about 70 wt % of an aromatic vinyl-vinyl cyanide compound copolymer (B); about 0.1 to about 5 wt % of a polyalkyl (meth)acrylate resin (C); and optionally a (meth)acrylic acid alkyl ester component-containing styrene-based copolymer resin (E) wherein said percentages are based on (A), (B), (C), and when present (E); and
   about 0.1 to about 3 parts by weight of a (meth)acrylic compound-grafted silicon-based impact reinforcing agent (D) based on about 100 parts by weight of the base resin of (A), (B), (C) and (E) when present,
   wherein the (meth)acrylic graft copolymer (A) has a core-shell structure in which an unsaturated monomer including (meth)acrylate is grafted to a core including an acrylate-based rubber-like polymer to thereby form a shell.

2. The thermoplastic resin composition of claim 1, wherein the polyalkyl(meth)acrylate resin has a weight average molecular weight of about 10,000 to about 200,000 g/mol.

3. The thermoplastic resin composition of claim 1, wherein the (meth)acrylic compound-grafted silicon-based impact reinforcing agent (D) includes a silicon-based compound as a core and a (meth)acrylic compound as a shell.

4. The thermoplastic resin composition of claim 3, wherein a weight ratio of the core to the shell in the (meth)acrylic compound-grafted silicon-based impact reinforcing agent is about 60 to 90: about 10 to 40.

5. The thermoplastic resin composition of claim 1, further comprising the (meth)acrylic acid alkyl ester component-containing styrene-based copolymer resin (E).

6. The thermoplastic resin composition of claim 5, wherein the (meth)acrylic acid alkyl ester component-containing styrene-based copolymer resin (E) includes about 5 to 50 wt % of a (meth)acrylic acid alkyl ester component.

7. The thermoplastic resin composition of claim 1, wherein a weight mixing ratio of the polyalkyl(meth)acrylate resin to the (meth)acrylic compound-grafted silicon-based impact reinforcing agent is about 2:1 to about 2:4.

8. The thermoplastic resin composition of claim 1, further comprising an antioxidant, a lubricant, an impact reinforcing agent, a light stabilizer, a dye, a pigment, a flame retardant, a filler, a stabilizer, an antibacterial agent, a release agent, a plasticizer, an antistatic agent, or a mixture thereof.

9. A molded product manufactured by the thermoplastic resin composition of claim 1.

* * * * *